July 22, 1924.    1,501,938
V. K. BOYNTON ET AL
MASONRY CONSTRUCTION FOR CHEMICAL APPARATUS
Filed July 13, 1918    2 Sheets-Sheet 1

July 22, 1924.
V. K. BOYNTON ET AL
1,501,938
MASONRY CONSTRUCTION FOR CHEMICAL APPARATUS
Filed July 13, 1918    2 Sheets-Sheet 2
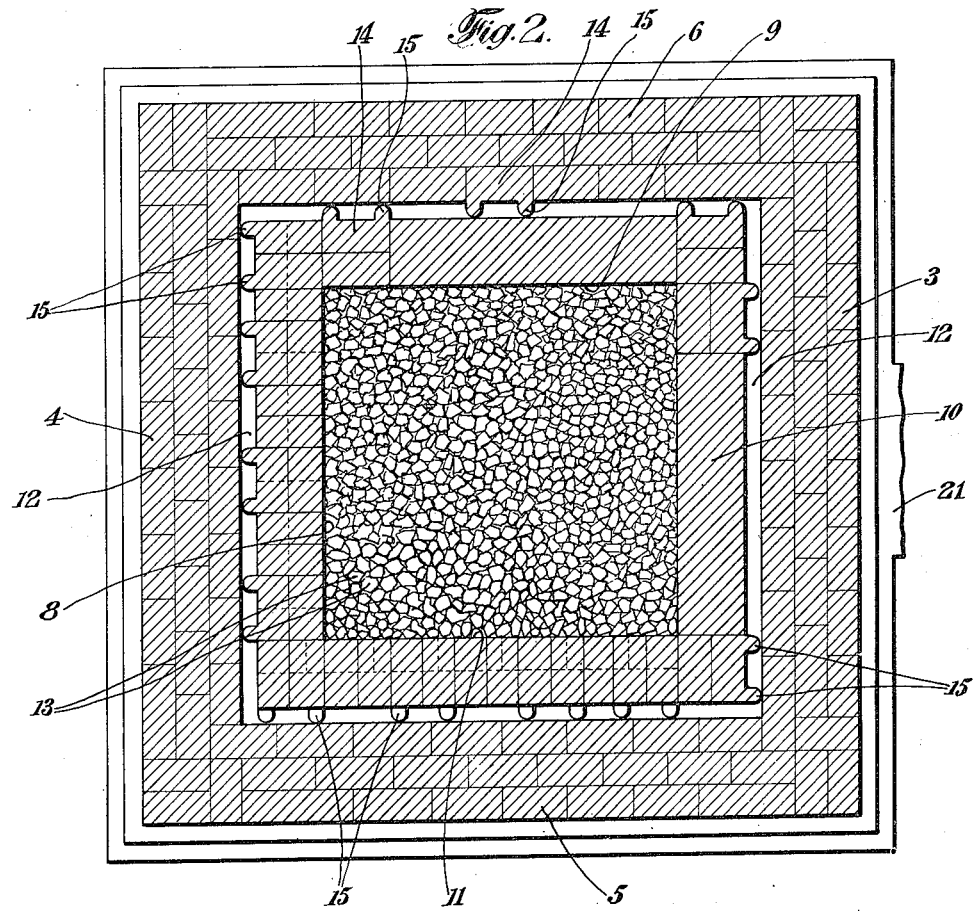
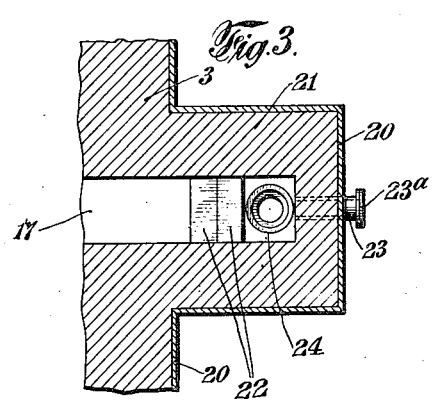
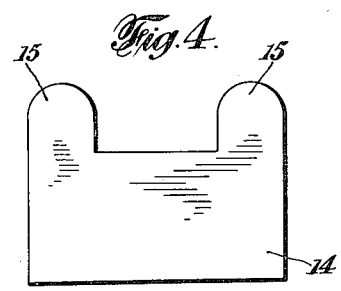
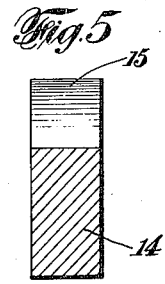

Patented July 22, 1924.

1,501,938

UNITED STATES PATENT OFFICE.

VERN K. BOYNTON, OF NEW YORK, AND PAUL W. WEBSTER, OF PELHAM MANOR, NEW YORK, ASSIGNORS TO PERRY & WEBSTER INCORPORATED, OF ELIZABETH, NEW JERSEY, A CORPORATION OF NEW JERSEY.

MASONRY CONSTRUCTION FOR CHEMICAL APPARATUS.

Application filed July 13, 1918. Serial No. 244,825.

*To all whom it may concern:*

Be it known that we, VERN K. BOYNTON, of New York city, in the county and State of New York, and PAUL W. WEBSTER, of Pelham Manor, in the county of Westchester and in the State of New York, have invented a certain new and useful Improvement in Masonry Constructions for Chemical Apparatus, and do hereby declare that the following is a full, clear, and exact description thereof.

The object of our invention has been to provide a masonry construction which, while adapted for other purposes, is especially adapted for use in chemical apparatus and which shall have the advantages of decreasing the tendency of the walls to crack, and of entrapping gases and liquids to such an extent that it is practicable to treat the gases and liquids in containers built according to our invention.

In the accompanying drawings:

Fig. 2 is a horizontal sectional view of Fig. 1, the left hand wall being shown at the level of the line $x$—$x$ of Fig. 1, and the lower or front wall being shown at the level of the line $y$—$y$ of Fig. 1.

Fig. 3 is a partial horizontal sectional view taken on the line 3—3 of Fig. 1.

Figs. 4 and 5 are, respectively, a plan view and a vertical sectional view of a special brick used in our construction.

Figure 1:
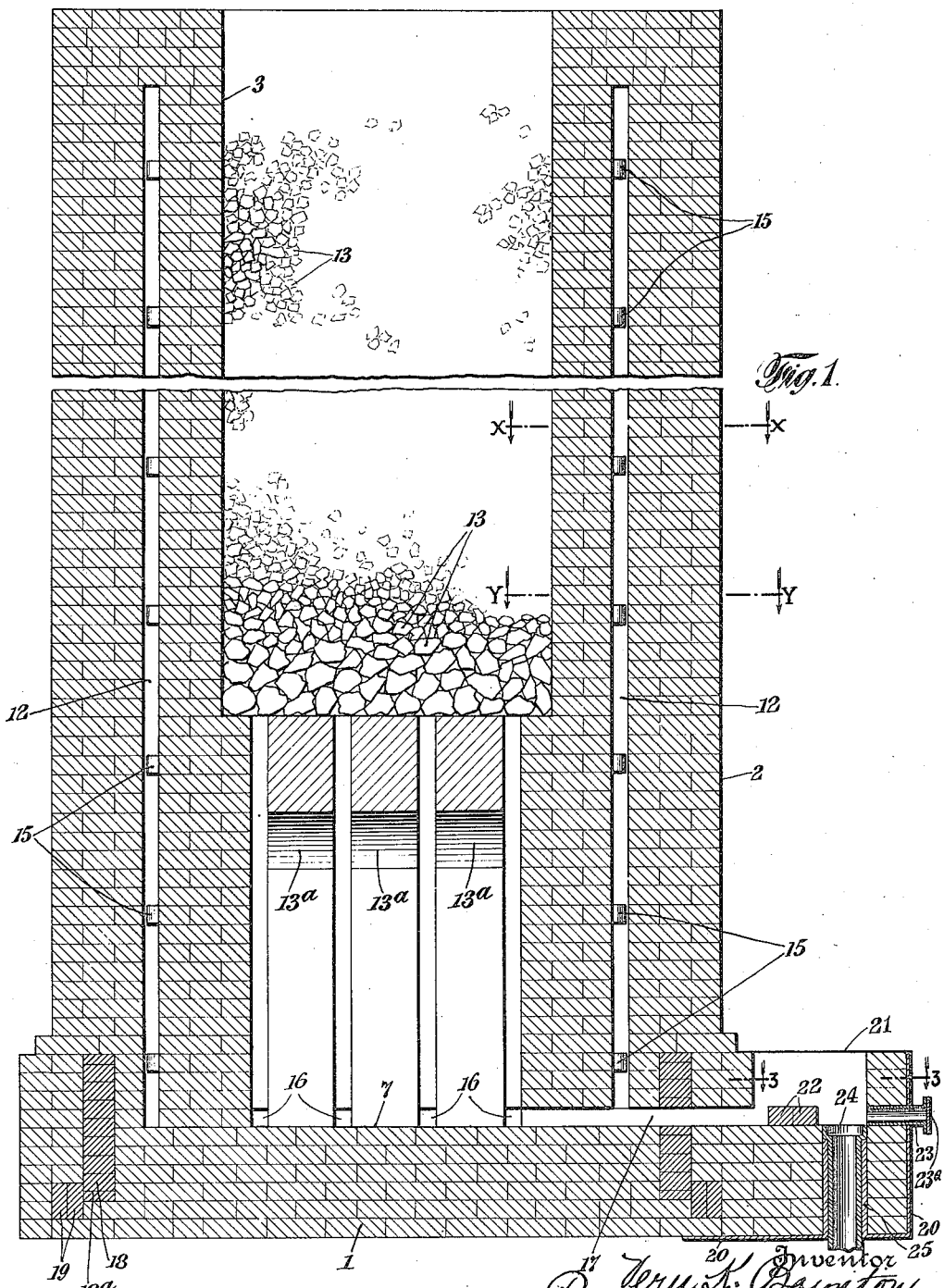
Figure 1 is a vertical sectional view of a concentrating tower embodying our invention.

Prior to our invention, containers for gases and liquids have been built of masonry construction, such as concentrating towers for the concentration of sulphuric acids and other liquids, but these prior constructions, according to our information, crack sooner or later, presumably by reason of the expansion set up therein by the temperatures and changes of temperatures to which they are subjected in the practical working of them, and these cracks allow gases or liquids to escape to the exterior. This not only results in the loss of gases and liquids and interferes with the most efficient operation of the apparatus, but promotes its deterioration and causes contamination of the atmosphere. This cracking has resulted in the prior art, notwithstanding that bonding material for the brick or stone or some form of composition or cement has been used which was sufficiently impervious to the action of liquids and gases to prevent leakage if the cracks had not occurred. It is impossible in practice to produce or maintain equal temperatures throughout the construction, the differences in temperatures between various parts of the construction being very pronounced, and the expansion or contraction due to the differences in temperatures is much greater than the elasticity of the materials. Thus, though bonding material was used which would have prevented leakage, were it not for the differences in temperatures, these differences have nevertheless resulted in cracks, with the consequent defects above stated.

Because of these defects in prior masonry construction, it has been the practice to overlay containers, such as concentrating towers for acids, with a metallic covering, such as sheet lead, but this results in a very expensive construction.

Our invention is capable of embodiment in many different forms, and while we have chosen for the illustration of our invention that embodiment which is the best one known to us, such embodiment is to be regarded only as typical of many possible embodiments, and our invention is not to be confined thereto.

The illustrated embodiment is a concentrating tower for concentrating sulphuric acid and other liquids. In the most complete form of our invention, and in that one illustrated in the drawings, we preferably form an inner enclosure for the liquids and gases which is composed of several relatively movable wall-sections, so that expansion and contraction can take place with a minimum of cracking of the walls, and have surrounded the inner enclosure with an outer enclosure consisting preferably of a single wall structure which therefore is fluid tight, or integral, the outer and inner enclosures being preferably separated by a space in which any gases and liquids escaping from the inner enclosure are entrapped and the liquids led back into the mass of liquid at the bottom of the inner enclosure. Such a construction provides for unavoidable expansion and contraction in the walls forming the space within which the concentrating operation is performed and saves the outer walls from the greater part of such expansion and contraction and yet entraps and prevents the escape of the gases and acids which pass through the joints between the relatively movable inner walls and through any cracks that may be formed.

Referring now to the particular embodiment illustrated in the drawings:—The concentrating tower shown therein consists of a base (1) from which rises an exterior enclosure (2) consisting of four walls (3), (4), (5) and (6). Within the said walls is a flat platform (7) upon which stand four walls (8), (9), (10) and (11) which form an inner enclosure. The side of the wall (8) overlaps the end of the wall (9); the side of the wall (9) overlaps the end of the wall (10); and the side of the wall (11) overlaps the end of the wall (8), open or uncemented joints being formed between the walls at these points. The walls of the inner enclosure merely rest upon the platform (7) and are not cemented thereto. This construction permits great freedom of movement of the walls making up the inner enclosure with comparative freedom from strain, so that the tendency of the walls to crack is reduced to a minimum. A space (12) is formed between the inner enclosure and the outer enclosure, preferably all the way around, and this space is closed at the top by some form of cover connecting the inner and outer walls. We prefer, as shown, to join these inner and outer walls by completing the masonry into a common wall. Thus the walls of the inner enclosure from the bottom upward, where the greatest temperatures occur, are free to move, and it is comparatively safe to join them to the outer walls at the top because the temperatures there are relatively much lower.

If the floating, or movable, inner walls are sufficiently thin to need it, they may be supported on the inside by the usual filling materials (13), which, in the present instance, are supported on arches (13ª).

Similarly, in case these inner walls are thin enough to need support to prevent outward movement and also to keep their alignment and to maintain the space (12) at its predetermined width, we prefer to provide projections either on the outer or the inner wall. We prefer to do this by means of the special brick shown in Figs. 4 and 5. This brick consists preferably of body (14) of the size and width of standard brick for the purpose, and projections (15) formed on such body, preferably having round outer surfaces. These special brick may, as we prefer, be laid in the outer wall, as shown in the upper portion of Fig. 2, or, as also shown in said figure, such brick may be laid in the inner walls. The projections (15) are made round in order to provide a minimum contact between the brick and the opposing wall, so that, if liquid, for instance, has passed through the cracks or joints of the inner walls and is flowing down the outer surface of such wall, the projections (15) will offer the minimum obstruction to the flow of the liquid and consequently will tend to the least extent to divert it to the outer wall and so afford an opportunity for it to escape through any cracks in the outer wall. Similarly, the round projections when touching the outer wall have less tendency to divert the liquid to the outer wall than they would have if they had a surface contact with that wall instead of a line contact. In that event, however, the liquid will tend principally to flow down the passage between the two walls, instead of to seep out through any cracks of the outer wall.

Connecting the foot of the space (12) with the interior of the concentrating tower are passages (16) extending from the space (12) through the inner walls to the interior of the concentrating tower. Any liquid which does flow down through the space (12) will, therefore, be returned to the interior of the tower by the passages (16).

It will therefore be seen that each of the inner walls is supported both on the inner and the outer sides and that it is free to move in the direction of its length by sliding upon (and not affecting) the wall whose end rests against its face.

In the use of such a concentrating tower, it is customary in the treatment of liquids to introduce the liquid at the top of the tower and allow it to flow by gravity over the packing material to the bottom and to withdraw it from the bottom, at the same time introducing at the bottom heated or other treating gases and allowing them to escape at the top. We desire to maintain the liquid in the bottom of the tower at a sufficient height to seal the passages (16) and also to seal the passage (17) by which the acid is drawn off from the tower.

In order particularly to guard against the acid flowing through any cracks in the base and toward the bottom of the outer walls (where the hydrostatic pressure is greatest) and to still further reduce the chance of cracks forming in that portion of the outer walls, we have introduced a vertical course of brick (18) whose intermediate joints are not at the same level as any of the joints of the main construction; and at the bottom of the course (18), we have sealed the joint (18ª) which is at the same level as a joint in the base by placing one or more bricks (19) (preferably two bricks) in a vertical position, as shown. We also preferably enclose the base in a lead pan (20) which rises along its sides to the level of the top of the outflow box (21). The outflow passage (17) enters the box (21) as shown, and we provide a dam (22) removably placed between the inner walls of the box, for the purpose of maintaining the liquid high enough to seal the passages (16) and (17).

As a means of cleaning the passages (16) and (17) and removing refuse from the bottom of the tower, we provide preferably a lead pipe (23) which is united to the vertical portion of the lead pan and which has a removable cover (23ª). Thus the dam (22) may be taken out of the outflow box, and, the cover (23ª) being taken off, a cleaning implement can be inserted through the pipe (23) into the aligned passage (16) and (17). As it is not feasible to permit some acids, particularly when they are hot, to flow over a lead surface, we have devised a form of outflow in which an acid-proof, metal or vitrified pipe (24) is used and have made a substantially acid-proof joint between such pipe and the lead pan (20) in the following manner:—We have cast a sleeve (25) of lead about the pipe (24) which, in cooling, contracts about the pipe and makes a substantially fluid-tight joint, and this permits us to "burn" the lower end of the sleeve to the lead pan (20), making a perfect joint at that point.

This form of overflow box provides an exceedingly efficient and convenient construction of great simplicity and at relatively low cost.

In the operation of the illustrated tower, the walls of the inner enclosure being free to expand freely in the direction of their length and more or less in other directions, will, as stated, have very much less tendency to crack than if they were all integral with each other. If cracking does occur, liquids will pass through these cracks, (and it also, of course, passes through the open joints between the walls), but the amount of liquid so passing will be comparatively small and it will flow down the walls of the space (12) and be returned to the interior of the tower through the passages (16). As the inner walls will take the heat from the inner chamber and as the space (12) will form an insulator to hinder the transmission of heat from the inner to the outer walls, the outer walls will have comparatively little tendency to crack. Thus, with our construction not only will very little liquid reach the inner surface of the outer walls, but those walls will have comparatively few cracks therein. To provide greater freedom of expansion at the top, a suitable cover for the space (12) not bonded to one of the walls, may be used, such as a metal cover.

The liquid which collects in the bottom of the tower will prevent the temperature of the tower base from rising above the boiling point of the liquid and consequently, except in the case of liquids with extremely high boiling points, this will tend to prevent the temperature from rising to a degree which will form excessive cracks.

In ordinary practice, it is customary to operate such constructions under suction; thus a partial vacuum exists in the interior and the gases will therefore not tend to escape through any cracks in the exterior walls.

While we have shown our tower constructed of brick, this is only for the purposes of illustration, and it is to be understood that stone or other suitable material may be used in place of brick.

We claim:

1. In an apparatus of the class described, the combination of a flat base, an outer enclosure and an inner enclosure, the latter consisting of a plurality of walls loosely mounted on said base.

2. In an apparatus of the class described, the combination of a flat base, an outer enclosure formed integrally, and an inner enclosure, consisting of a plurality of walls loosely mounted on said base, an end of each of said walls resting against the face of a neighboring wall.

3. In an apparatus of the class described, the combination of a base, an outer enclosure integrally formed, and an inner enclosure, consisting of walls loosely mounted on said base and enclosing a prismatic space, each wall forming one side of said prism.

4. In an apparatus of the class described, the combination of a base, an outer enclosure integrally formed, and an inner enclosure, consisting of walls loosely mounted on said base and enclosing a prismatic space, each wall forming one side of said prism and an end of each wall resting against the face of a neighboring wall.

5. In an apparatus of the class described, the combination of a base, an outer enclosure integrally formed, and an inner enclosure, consisting of walls loosely resting on said base, said walls being united with said outer enclosure at the top of the apparatus.

6. In an apparatus of the class described, the combination of a base, an outer enclosure integrally formed, and an inner enclosure, consisting of walls loosely resting on said base, said walls being united with said outer enclosure at the top of the apparatus, and end portions of certain of said walls resting against the faces of adjacent walls.

7. In an apparatus of the class described, the combination of a base, an outer enclosure integrally formed, and an inner enclosure, consisting of walls loosely resting on said base and overlapping each other, filling in said inner enclosure sustaining said walls in an inward direction and projections between said inner and outer walls sustaining said inner walls in an outward direction.

8. In an apparatus of the class described, the combination of a base, an outer enclosure integrally formed, and an inner enclosure, consisting of a plurality of relatively movable walls loosely mounted on said base, a space being formed between said outer and inner enclosures, and projections formed on one wall of said space, said projections having only line contact with the opposite wall.

9. In an apparatus of the class described, the combination of a base, an outer enclosure integrally formed, and an inner enclosure, consisting of a number of relatively movable walls loosely mounted on such base, a space being formed between said enclosures, and projections mounted on one of the walls of said space, the outer ends of said projections consisting of vertical rounded surfaces.

10. In an apparatus of the class described, the combination of a base, an outer enclosure integrally formed, and an inner enclosure, consisting of relatively movable walls loosely mounted on said base, and projections mounted within the outer enclosure to support said movable walls.

11. In an apparatus of the class described, the combination of a base, an outer enclosure integrally formed, and an inner enclosure, consisting of relatively movable walls loosely supported upon said base, means for maintaining liquid at a height above said base, said outer enclosure having placed therein a vertical series of bricks or blocks extending downward from the level of said liquid, the horizontal joints of said series being staggered relative to the joints of the bricks or blocks forming the main portion of said outer enclosure.

12. In an apparatus of the class described, the combination of a base, an outer enclosure integrally formed, and an inner enclosure, consisting of relatively movable walls loosely supported upon said base, means for maintaining liquid at a height above said base, said outer enclosure having placed therein a vertical series of bricks or blocks extending downward from the level of said liquid, the horizontal joints of said series being staggered relative to the joints of the bricks or blocks forming the main portion of said outer enclosure, said outer enclosure also having placed therein a brick or block, or a plurality of bricks or blocks, presenting a face to the lowermost horizontal joint of said vertical series of bricks or blocks.

13. In an apparatus of the class described, the combination of a base, an outer enclosure integrally formed, and an inner enclosure, consisting of relatively movable walls loosely supported upon said base, means for maintaining liquid at a height above said base, said outer enclosure having placed therein a vertical series of bricks or blocks extending downward from the level of said liquid, the horizontal joints of said series being staggered relative to the joints of the bricks or blocks forming the main portion of said outer enclosure, said outer enclosure also having placed therein a brick or block, or a plurality of bricks or blocks, presenting a face to the lowermost horizontal joint of said vertical series of bricks or blocks, and a metal pan enclosing said base and rising substantially to the level of said liquid.

14. In an apparatus of the class described, the combination of a base, an enclosure supported thereby, an outflow box for liquid contained within the enclosure, a passage connecting said enclosure with said box, and a removable dam in said box of a height to seal said passage and permit the liquid to flow over the dam.

15. In an apparatus of the class described, the combination of a base, an enclosure supported thereby, an outflow box having parallel walls for liquid contained within the enclosure, a passage through said enclosure into said box, and a removable dam placed in said box of a height to seal said passage and permit the liquid to flow over the dam.

16. In an apparatus of the class described, the combination of a base, an enclosure supported thereby, an outflow box having parallel walls, a passage through said enclosure into said box, and a removable dam placed in said box of a height to seal said passage, said box having an outflow below the surface on which said dam rests and having an opening through its wall, which opening is in line with said passage and with means for closing said opening.

17. In an apparatus of the class described, the combination of a base, an enclosure rising therefrom, an outflow box having a non-corrosive outflow pipe of relatively hard material, and a pan enclosing said base and box and made of relatively soft metal, said outflow pipe being enclosed in a sleeve of said soft metal, said sleeve being united at its lower end to said pan.

18. In an apparatus of the class described, the combination of a base and an enclosure supported thereby, an outflow box having parallel side walls, a passage connecting the interior of said enclosure with said outflow box, a dam removably mounted between the walls of said box, a pan of soft, non-corrosive metal enclosing said base and box, the wall of said box having an opening therethrough in line with said passage and through said metal pan and a closure for the opening in said pan.

19. In an apparatus of the class described, the combination of a base and an enclosure supported thereby, an outflow box having parallel side walls, a passage connecting the interior of said enclosure with said outflow box, a dam removably mounted between the walls of said box, a pan of soft, non-corrosive metal enclosing said base and box, the wall of said box having an opening therethrough in line with said passage and through said metal pan, a closure for said opening, an outflow pipe mounted in said base and formed of relatively hard material, and a sleeve of said soft metal cast about said outflow pipe, said sleeve being burned or otherwise united to said pan.

20. In an apparatus of the class described, the combination of a base and an enclosure supported thereby, an outflow box having parallel side walls, a passage connecting the interior of said enclosure with said outflow box, a dam removably mounted between the walls of said box, a pan of soft, non-corrosive metal enclosing said base and box, the wall of said box having an opening therethrough in line with said passage and through said metal pan, a closure for said opening, an outflow pipe mounted in said base and formed of relatively hard material, and a sleeve of soft metal cast about said outflow pipe, said sleeve being burned or otherwise united to said pan, the upper end of said outflow pipe being belled or flared out over said sleeve.

21. In an apparatus of the class described, the combination of a base, an enclosure rising therefrom, an outflow box in communication with the interior of said enclosure, a metallic pan enclosing said base and box, a non-corrosive outflow pipe leading from said box and through said pan, said outflow pipe being enclosed in a sleeve made of a metal readily unitable to said pan, said sleeve being united to the metal of said pan.

In testimony that we claim the foregoing we have hereunto set our hands.

VERN K. BOYNTON.
PAUL W. WEBSTER.